US010501063B2

(12) United States Patent
Krueger et al.

(10) Patent No.: US 10,501,063 B2
(45) Date of Patent: Dec. 10, 2019

(54) BRAKE-BY-WIRE SYSTEM

(71) Applicant: GM Global Technology Operations LLC, Detroit, MI (US)

(72) Inventors: Eric E. Krueger, Chelsea, MI (US); Brandon C. Pennala, Howell, MI (US); Christopher C. Chappell, Commerce Township, MI (US); Alan J. Houtman, Milford, MI (US); Kevin S. Kidston, New Hudson, MI (US); Patrick J. Monsere, Highland, MI (US); Michael C. Roberts, Auburn Hills, MI (US); Paul A. Kilmurray, Wixom, MI (US); Steven J. Weber, Mount Clemens, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 180 days.

(21) Appl. No.: 15/250,411

(22) Filed: Aug. 29, 2016

(65) Prior Publication Data
US 2018/0056960 A1 Mar. 1, 2018

(51) Int. Cl.
*B60T 13/74* (2006.01)
*B60T 17/18* (2006.01)

(52) U.S. Cl.
CPC .......... *B60T 13/741* (2013.01); *B60T 17/18* (2013.01); *B60T 2270/402* (2013.01); *B60T 2270/404* (2013.01)

(58) Field of Classification Search
CPC .......... B60T 8/88; B60T 8/885; B60T 13/741; B60T 17/18; B60T 2270/402; B60T 2270/404
See application file for complete search history.

(56) References Cited

U.S. PATENT DOCUMENTS

| 6,189,981 B1 * | 2/2001 | Niedermeier | B60T 7/042 303/122.04 |
| 6,299,261 B1 * | 10/2001 | Weiberle | B60T 8/885 303/122.04 |

(Continued)

FOREIGN PATENT DOCUMENTS

| CN | 102050102 A | 5/2011 |
| CN | 102050103 A | 5/2011 |
| CN | 102069789 A | 5/2011 |

OTHER PUBLICATIONS

Office Action for Chinese Application No. 201710719121.5; Application Filing Date Aug. 21, 2017; dated Jul. 10, 2019 (8 pages).

*Primary Examiner* — Bradley T King
(74) *Attorney, Agent, or Firm* — Cantor Colburn LLP

(57) ABSTRACT

A vehicle includes a plurality of brake assemblies and a plurality of electrical power circuits. Each brake assembly includes an electro-mechanical actuator configured to adjust a torque force applied to a wheel of the vehicle. The electrical power circuits are located remotely from one another. Each power circuit is configured to drive a respective actuator. The vehicle further includes a first electronic brake system (EBS) controller and a second EBS controller. The first EBS controller is configured to output a first data command signal to control a first group of power circuits among the plurality of power circuits. The second EBS controller is configured to output a second data command signal to control a second group of power circuits among the plurality of power circuits. The second group excludes the power circuits from the first group.

10 Claims, 6 Drawing Sheets

(56) References Cited

U.S. PATENT DOCUMENTS

| | | | | |
|---|---|---|---|---|
| 6,317,675 | B1* | 11/2001 | Stolzl | B60T 7/042 303/155 |
| 6,345,225 | B1* | 2/2002 | Bohm | B60T 8/321 180/197 |
| 6,402,259 | B2* | 6/2002 | Corio | B60T 8/1703 244/111 |
| 6,749,269 | B1* | 6/2004 | Niwa | B60T 13/741 303/115.2 |
| 7,837,278 | B2* | 11/2010 | Nilsson | B60T 8/321 188/158 |
| 2001/0032042 | A1 | 10/2001 | Disser et al. | |
| 2008/0236964 | A1* | 10/2008 | Kikuchi | B60T 13/741 188/162 |
| 2010/0204894 | A1* | 8/2010 | Strengert | B60T 17/221 701/70 |
| 2010/0243388 | A1* | 9/2010 | Holzwarth | B60T 8/885 188/158 |
| 2011/0320099 | A1* | 12/2011 | Kim | B60T 8/885 701/70 |
| 2018/0056959 | A1* | 3/2018 | Pennala | B60T 13/741 |
| 2018/0056961 | A1* | 3/2018 | Krueger | B60T 13/741 |
| 2018/0056964 | A1* | 3/2018 | Pennala | B60T 13/741 |
| 2018/0056965 | A1* | 3/2018 | Houtman | B60T 13/741 |

\* cited by examiner

BRAKE-BY-WIRE SYSTEM

FIELD OF THE INVENTION

The invention disclosed herein relates to vehicle braking systems and, more particularly, to a vehicle including a brake-by-wire (BBW) system.

BACKGROUND

Current industrial automotive trends to reduce the number of overall mechanical components of the vehicle and to reduce the overall vehicle weight have contributed to the development of system-by-wire applications, typically referred to as X-by-wire systems. Once such X-by-wire system that has recently received increased attention is a brake-by-wire (BBW) system, sometimes referred to as an electronic braking system (EBS).

Unlike conventional mechanical braking systems, BBW systems actuate one or more vehicle braking components via an electric signal generated by an on-board processor/controller or received from a source external to the vehicle. In some systems, a BBW system is effected by supplanting a conventional hydraulic fluid-based service braking system with an electrical base system to perform basic braking functions. Such a system is typically provided with a manually actuated back-up system that may be hydraulically operated.

Since BBW systems typically remove any direct mechanical linkages and/or or hydraulic force-transmitting-paths between the vehicle operator and the brake control units, much attention has been given to designing BBW control systems and control architectures that ensure reliable and robust operation. Various design techniques have been implemented to promote the reliability of BBW systems including, for example, redundancy, fault tolerance to undesired events (e.g., events affecting control signals, data, hardware, software or other elements of such systems), fault monitoring and recovery. One design approach to provide fault tolerance which has been utilized in BBW brake control systems has been to include a mechanical backup system that may be utilized as an alternate means for braking the vehicle.

SUMMARY

A non-limiting embodiment provides a vehicle including a fault tolerant electronic brake-by-wire (BBW) system. The vehicle comprises a plurality of brake assemblies and a plurality of electrical power circuits. Each brake assembly includes an electro-mechanical actuator configured to adjust a torque force applied to a wheel of the vehicle. The electrical power circuits are located remotely from one another. Each power circuit is configured to drive a respective actuator. The vehicle further includes a first electronic brake system (EBS) controller and a second EBS controller. The first EBS controller is configured to output a first data command signal to control a first group of power circuits among the plurality of power circuits. The second EBS controller is configured to output a second data command signal to control a second group of power circuits among the plurality of power circuits. The second group excludes the power circuits from the first group.

According to another non-limiting embodiment, a vehicle including a fault tolerant electronic brake-by-wire (BBW) system comprises a plurality of brake assemblies, a plurality of electrical power circuits, and a plurality of electronic brake system (EBS) controllers. Each brake assembly includes an electro-mechanical actuator configured to decelerate a respective wheel of the vehicle. The electrical power circuits are located remotely from one another. Each power circuit is configured to drive a respective actuator. Each EBS controller among the plurality of EBS controller is in electrical communication with each power circuit among the plurality of power circuits.

According to still another non-limiting embodiment, a method of controlling a fault tolerant electronic brake-by-wire (BBW) system comprises detecting a brake request to brake at least one wheel of the vehicle, and outputting, via a first electronic brake system (EBS) controller, a first data command signal to control a first group of power circuits among the plurality of power circuits. The method further comprises outputting, via a second EBS controller, a second data command signal to control a second group of power circuits among the plurality of power circuits, the second group excluding the power circuits from the first group. The method further comprises outputting a first high-power drive signal from at least one power circuit included in the first group, and outputting a second high-power drive signal from at least one power circuit included in the second group. The method further comprises controlling at least one actuator based on at least one of the first and second high-power drive signals so as to brake the at least one wheel according to the brake request.

The above features and advantages and other features and advantages of the invention are readily apparent from the following detailed description of the invention when taken in connection with the accompanying drawings.

BRIEF DESCRIPTION OF THE DRAWINGS

Other features and details appear, by way of example only, in the following detailed description of embodiments, the detailed description referring to the drawings in which.

DESCRIPTION OF THE EMBODIMENTS

Figure 1:
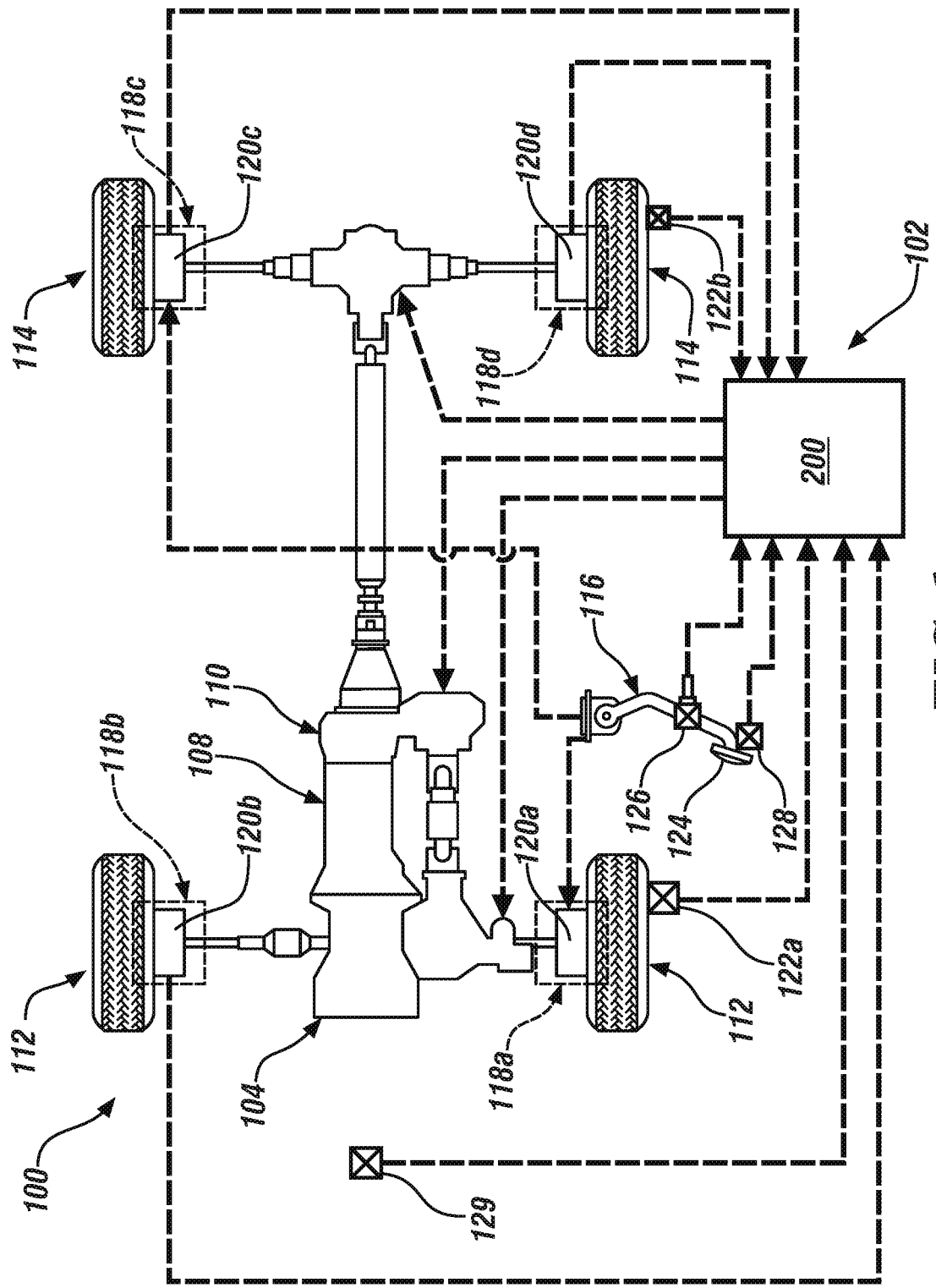
FIG. 1 is a top schematic view of a vehicle having a fault tolerant BBW system in accordance with a non-limiting embodiment.

The following description is merely exemplary in nature and is not intended to limit the present disclosure, its application or uses. It should be understood that throughout the drawings, corresponding reference numerals indicate like or corresponding parts and features.

Various non-limiting embodiments provide a fault tolerant BBW system including various independent BBW components to provide maximum flexibility in physical packaging. In at least one embodiment, the vehicle includes a plurality of brake assemblies, each including a respective actuator unit that controls a braking torque applied to the wheels. At least one brake assembly (e.g., a first brake assembly) among the plurality of brake assemblies is driven by a first electronic power circuit, while at least one other brake assembly (e.g., a second brake assembly) among the plurality of brake assemblies is driven by a second power circuit different from the first power circuit. In addition, the vehicle includes a plurality of individual electronic brake system (EBS) controllers. For example, a first EBS controller controls the first power circuit, while a second EBS controller, different from the first EBS controller, controls the second power circuit. Accordingly, a flexible BBW system is provided that allows for flexible design choice, wire length reduction, and flexible braking algorithm implementation, while still employing fault tolerance into the system.

With reference now to FIG. 1, a vehicle 100 including a fault tolerant BBW system 102 configured to electronically control braking of the vehicle 100 is illustrated according to a non-limiting embodiment. The vehicle 100 is driven according to a powertrain system that includes an engine 104, a transmission 108 and a transfer case 110. The engine 104 includes, for example, an internal combustion engine 104 that is configured to generate drive torque that drives front wheels 112 and rear wheels 114 using various components of the vehicle driveline. Various types of engines 104 may be employed in the vehicle 100 including, but not limited to, a diesel engine, a gasoline engine, a battery electric vehicle including an electric motor, and a hybrid-type engine that combines an internal combustion engine with an electric motor, for example. The vehicle driveline may be understood to comprise the various powertrain components, excluding the engine 104. According to a non-limiting embodiment, engine drive torque is transferred to the transmission 108 via a rotatable crank shaft (not shown). Thus, the torque supplied to the transmission 108 may be adjusted in various manners including, for example, by controlling operation of the engine 104 as understood by one of ordinary skill in the art.

The fault tolerant BBW system 102 comprises a pedal assembly 116, brake assemblies 118a-118d (i.e., brake corner modules), one or more actuator units 120a-120d, one or more one or more wheel sensors 122a and 122b, and one or more electronic brake system (EBS) controllers 200. Although four brake assemblies are illustrated, the invention is not limited thereto. For example, the fault tolerant BBW system 102 may include two brake assemblies installed in various arrangements without changing the scope of the invention.

The pedal assembly 116 is in signal communication with the EBS controller 200, and includes a brake pedal 124, one or more pedal force sensors 126, and one or more pedal travel sensors 128. In at least one embodiment, the pedal force sensors and the pedal travel sensor are each connected to multiple controllers installed in the vehicle to provide output redundancy. The EBS controller 200 is configured to detect brake pedal travel and/or braking force applied to the brake pedal 124 based on respective signals output from the pedal force sensor 126, and the pedal travel sensor 128. According to a non-limiting embodiment, the pedal force sensor 126 is implemented as a force transducer or other suitable force sensor configured or adapted to precisely detect, measure, or otherwise determine an apply force or force imparted to the brake pedal 124 by an operator of vehicle 100. The pedal travel sensor 128 may be implemented as a pedal position and range sensor configured or adapted to precisely detect, measure, or otherwise determine the relative position and direction of travel of brake pedal 124 along a fixed range of motion when the brake pedal 124 is depressed or actuated.

The measurements or readings obtained by the pedal force sensor 126 and the pedal travel sensor 128 are transmittable or communicable to one or more EBS controllers 200 or are otherwise determinable thereby as needed for use with one or more braking algorithms stored in memory of the EBS controller 200. The EBS controller 200 is also configured to calculate, select, and/or otherwise determine a corresponding braking request or braking event in response to the detected and recorded measurements or readings output from the wheel sensors 122a and 122b. Based on the determined braking request or braking event, the EBS controller 200 outputs a low voltage data command signal that invokes a braking action to slow down the vehicle 100 as discussed in greater detail herein.

The wheel sensors 122a and 122b may provide various types of vehicle data including, but not limited to, speed, acceleration, deceleration, and vehicle angle with respect to the ground, and wheel slippage. In at least one embodiment, the fault tolerant BBW system 102 may include one or more object detection sensors 129 disposed at various locations of the vehicle 100. The object detection sensors 129 are configured to detect the motion and/or existence of various objects surrounding the vehicle including, but not limited to, surrounding vehicles, pedestrians, street signs, and road hazards. The EBS controller 200 may determine a scenario (e.g., a request and/or need) to slow down and/or stop the vehicle based on the data provided by the pedal unit 116, the wheel sensors 122a-122d, and/or the object detection sensor 129. In response to determining the braking scenario, the EBS controller 200 communicates a braking command signal to one or more brake assemblies 118a-118d to slow or stop the vehicle 100.

In at least one embodiment, the EBS controller 200 outputs a low voltage data signal (e.g., a digital braking command signal) to a driver component or power circuit via a datalink. In at least one embodiment, one or more braking command signals are transmitted across one or more command signal transmission channels or lines to initiate operation of a driver that drives an actuator of the brake assembly 118a-118d. The signal transmission channels may be constructed according to various communication protocols including, but not limited to, FlexRay™, Ethernet, and a message-based communication bus such as, for example, a controller area network (CAN) protocol. FlexRay™ is a high-speed, fault tolerant time-triggered protocol including both static and dynamic frames. FlexRay™ may support high data rates of up to 10 Mbit/s.

According to at least one embodiment, the fault tolerant BBW system 102 may also include an isolator module (not shown in FIG. 1) and one or more power sources (not shown in FIG. 1). The isolator module may be configured as an electrical circuit and is configured to isolate wire-to-wire short circuits on a signaling line circuit (SLC) loop. The isolator module also limits the number of modules or detectors that may be rendered inoperative by a circuit fault (e.g. short to ground/voltage, over-voltage, etc.) on the SLC loop or by a circuit fault of one or more power sources 204a and 204b, FIG. 2 (e.g. under-voltage, over-voltage, power source failure, etc.). According to a non-limiting embodiment, if a circuit fault condition occurs, the isolator module may automatically create an open-circuit (disconnect) in the SLC loop so as to isolate the brake assemblies 118a-118d from a circuit fault condition. In addition, if a failure of a power source occurs, the isolator module may disconnect the failed power source while maintaining the remaining power sources. In this manner, the fault tolerant BBW system 102, according to a non-limiting embodiment, provides at least one fault tolerant feature, which may allow one or more brake assemblies 118a-118d to avoid failure in the event a circuit fault condition occurs in the EBS controller 200. When the circuit fault condition is removed, the isolator module may automatically reconnect the isolated section of the SLC loop, e.g., the brake assemblies 118a-118d.

In at least one embodiment, the EBS controller 200 includes programmable memory (not shown in FIG. 1) and a microprocessor (not shown in FIG. 1). In this manner, the EBS controller 200 is capable of rapidly executing the necessary control logic for implementing and controlling the actuators 120a-120d using a brake pedal transition logic method or algorithm which is programmed or stored in memory.

The EBS controller 200 (e.g., the memory) may be preloaded or preprogrammed with one or more braking torque look-up tables (LUTs) i.e. braking torque data tables readily accessible by the microprocessor in implementing or executing a braking algorithm. In at least one embodiment, the braking torque LUT stores recorded measurements or readings of the pedal force sensor 126 and contains an associated commanded braking request appropriate for each of the detected force measurements as determined by the pedal force sensor 126. In a similar manner, the EBS controller 200 may store a pedal position LUT, which corresponds to the measurements or readings of the pedal travel sensor 128 and contains a commanded braking request appropriate for the detected position of pedal travel sensor 128.

Figure 2A:
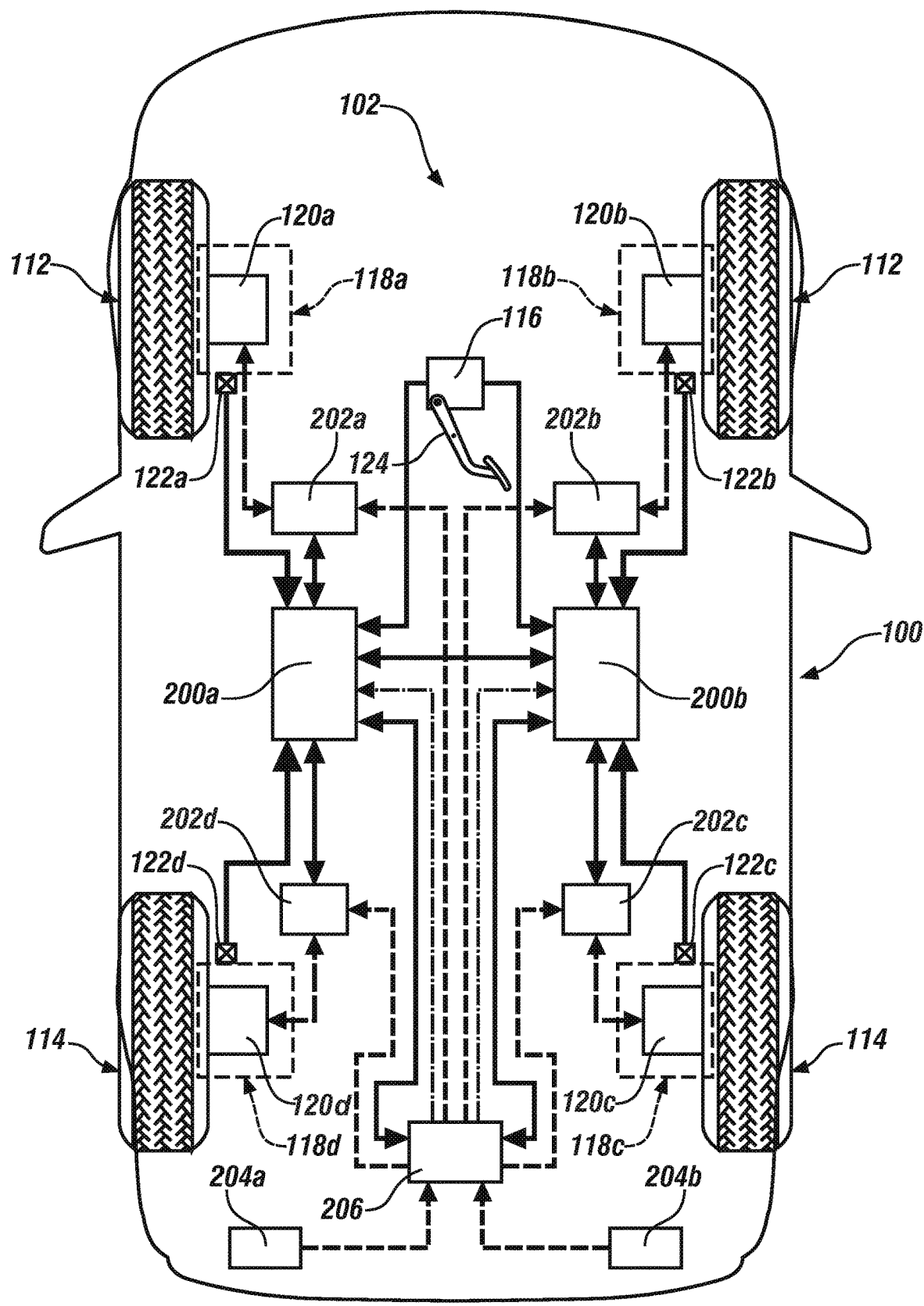
FIG. 2A is a schematic view of a fault tolerant BBW system based on a split EBS controller topology according to a non-limiting embodiment.
Figure 2B:
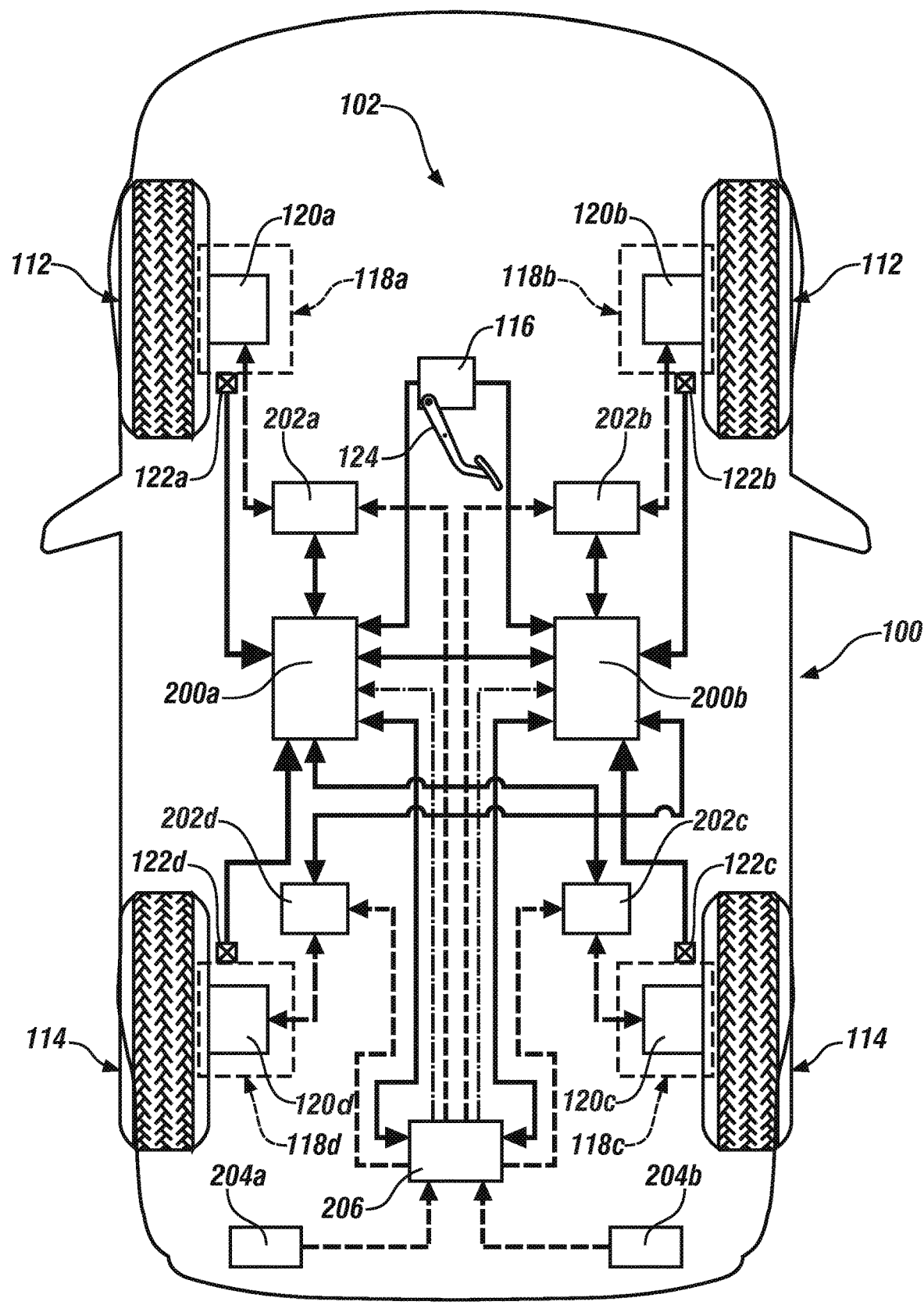
FIG. 2B is a schematic view of a fault tolerant BBW system based on another split EBS controller topology according to a non-limiting embodiment
Figure 2C:
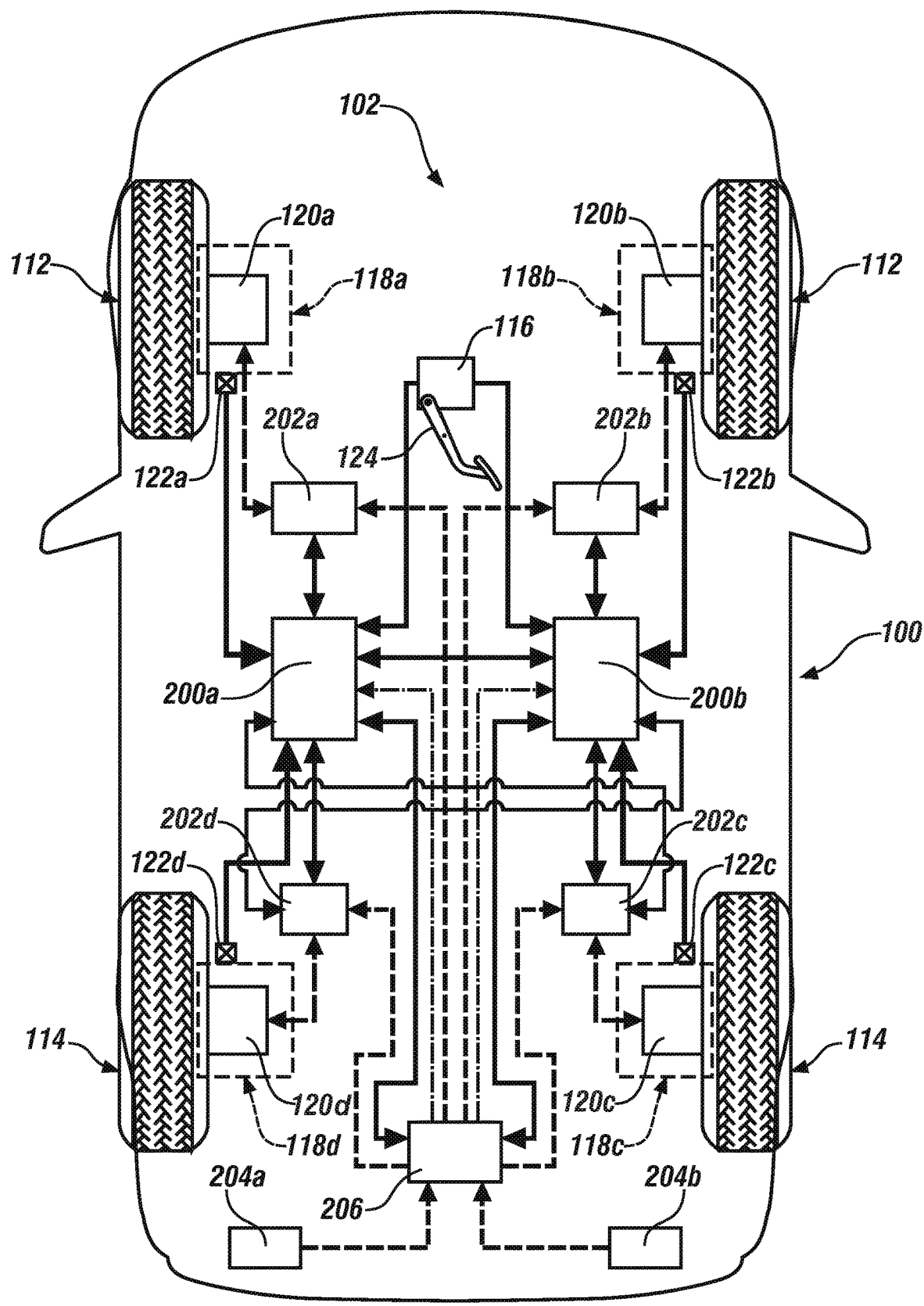
FIG. 2C is a is a schematic view of a fault tolerant BBW system based on a full EBS controller topology according to a non-limiting embodiment.

Turning to FIGS. 2A-2C, various embodiments of a brake-by-wire (BBW) system are illustrated. Referring first to FIG. 2A, a fault tolerant BBW system 102 based on a split-electronic brake system (EBS) controller topology is illustrated according to a non-limiting embodiment. The fault tolerant BBW system 102 includes a plurality of brake assemblies 118a-118d. Each brake assembly 118a-118d includes a respective actuator unit 120a-120d that controls a braking torque applied to a respective wheel 112-114. The actuator unit 120a-120d may include, but are not limited to, a motor that drives an electronic caliper (e-caliper). The motor operates in response to a high-frequency switched high-power current, and in turn drives the e-caliper which applies a variable frictional force to slow down the wheels 112-114 in response according to a stopping command input by the vehicle driver.

According to a non-limiting embodiment, each brake assembly 118a-118d is driven by a respective electronic power circuit 202a-202d. The electronic power circuits 202a-202d may include various power electronic components including, but not limited to, h-bridges, heat sinks, application-specific integrated circuits (ASICs), controller area network (CAN) transceivers or temperature or current sensors.

The power circuits 202a-202d are located remotely from the brake assemblies 118a-118d, while still being in electrical communication therewith so as to output an electrical signal that drives a respective electro-mechanical actuator 120a-120d. The location of the power circuits 202a-202d are also flexible and are not limited to any particular area of the vehicle 100. In this manner, the power circuits 202a-202d may be located in close proximity of a related brake assembly 118a-118d so as to reduce the length of the high-current wires that deliver the switching high-frequency current signals (illustrated as dashed arrows) for driving a respective electro-mechanical actuator 120a-120d as discussed in greater detail below.

In addition, the fault tolerant BBW system 102 includes a plurality of individual electronic brake system (EBS) controllers 200a and 200b. In at least one embodiment, the first EBS controller 200a is located remotely from the second EBS controller 200b. The EBS controllers 200a and 200b receive one or more input data signals 300, FIG. 3, delivered by one or more vehicle sensors (e.g., wheel sensors 122a-122d), and outputs one or more output data signals 302, FIG. 3, to one or more electronic power circuits 202a-202d.

Figure 3:
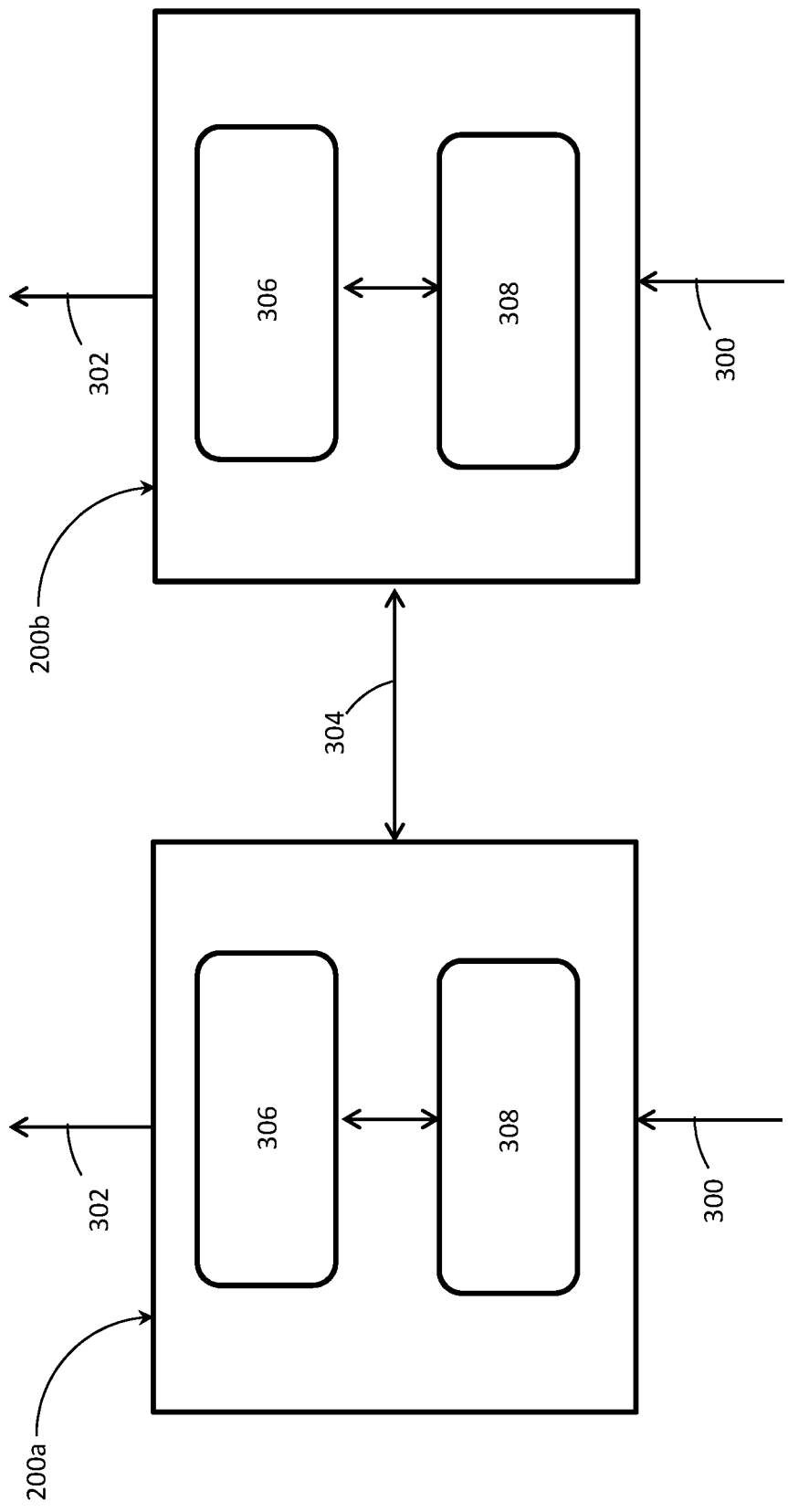
FIG. 3 is a block diagram illustrating a plurality of EBS controllers included in a fault tolerant BBW system according to a non-limiting embodiment.

The first and second EBS controller 200a and 200b may also share various data 304 between one another (see FIG. 3). The shared data includes, for example, detected brake requests, and diagnostic results obtained after performing self-diagnostic tests. Each EBS controller 200a and 200b also includes a hardware processor 306 and memory 308 that stores executable instructions including, but not limited to, braking algorithms and self-diagnosis algorithms. The hardware processor 306 is configured to read and execute the instructions stored in the memory 308 so as to control the fault tolerant BBW system 102 as described in greater detail herein.

Still referring to the split-controller topology shown in FIG. 2A, the first EBS controller 200a controls a first group of power circuits e.g., 202a and 202d, while the second EBS controller 200b controls a second group of power circuits 202b and 202c. In at least one embodiment, the first EBS controller 200a is in electrical communication with the second EBS controller 200b via a communication interface. The communication interface includes, but is not limited to, FlexRay™, Ethernet, and a low-power message-based interface such as, for example, a CAN bus. In this manner, the first and second EBS controllers 200a and 200b may share data with each other.

The split-controller topology shown in FIG. 2A may be referred to as a front/rear split controller topology because the first EBS controller 200a controls a first set of front and rear power circuits 202a and 202d, respectively, while the second EBS controller 200b controls a second set of front and rear power circuits 202b and 202c, respectively. In another embodiment, the split-controller topology may be constructed as a diagonal split controller topology as illustrated in FIG. 2B. In this embodiment, the first EBS controller 200a controls a first front power circuit 202a and a first rear power circuit 202c located diagonally from the first front power circuit 202a. Similarly, the second EBS controller 200b controls a second front power circuit 202b and a second rear power circuit 202d located diagonally from the second front power circuit 202b.

The EBS controllers 200a and 200b monitor the state of the vehicle 100 based on inputs provided by one or more sensors. The sensors include, but are not limited to, the wheel sensors 122a-122d, and data signals output from the pedal unit 116. Although not illustrated in FIG. 2A, the pedal unit 116 includes the various sensors that monitor the pedal 124 including, but not limited to, the pedal force sensor and the pedal travel sensor as discussed in detail above. The outputs of the pedal force sensor and the pedal travel sensor may be delivered to both the first EBS controller 200a and the second EBS controller 200b to provide output redundancy. Based on the state of the vehicle 100, the first EBS controller 200a and/or the second EBS controller 200b determines whether to invoke a braking event to slow down and/or stop the vehicle. When a braking event is determined, the first and second EBS controllers 200a and 200b each output a low power data command signal to a respective group of power circuits 202a-202d. The low power data command signals can be delivered over the CAN bus to a respective power circuit 202a-202d.

The first EBS controller 200a outputs a braking event data command signal to a first power circuit 202a and a second power circuit 202d. The second EBS controller 200b outputs braking event data command signals to a third power circuit 202b and a fourth power circuit 202c. In at least one embodiment, the EBS controllers 200a and 200b electrically communicate with the power circuits 202a-202d via a message-based communication interface such as, for example, the CAN bus. In this manner, additional outputs may be conveniently added to the fault tolerant BBW system 102 without requiring additional heavy-weighted wiring.

Implementing a low voltage message-based interface also allows the first and second EBS controllers 200a and 200b to conveniently communicate data between one another. In this manner, the first EBS controller 200a can inform the second EBS controller 200b of various detected braking events, and vice versa. The first and second EBS controller 200a and 200b may also share self-diagnosis data between one another. Therefore, each controller 200a and 200b may compare data received from one another in order to diagnose the fault tolerant BBW system 102, e.g., in order to determine whether the fault tolerant BBW system 102 is operating correctly.

The power circuits 202a-202d each receive a high power input signal (e.g., high power input current) from a respective power source 204a and 204b. The high power input signal may include a high power current signal ranging from approximately 0 amps to approximately 200 amps.

In response to receiving a braking event data command signal from a respective EBS controller 200a and 200b, each power circuit 202a-202d is configured to output a high-frequency switched high-power signal to a respective brake assembly 118a-118d. The high-frequency switched high-power signal may have a frequency ranging from approximately 15 kilohertz (kHz) to approximately 65 kHz, and may have a current value of approximately 0 amps to approximately 200 amps. For example, the first EBS controller 200a may output a first braking event data command signal to the first power circuit 202a and/or may output a second event braking data command signal to the second power circuit 202d. In response to receiving the low power data command signals, the first power circuit 202a and/or the second power circuit 202d may operate to convert the continuous high power current signal output from the first power source 204a into a high-frequency switched high-current signal which is then delivered to the first actuator 120a installed in the first brake assembly 118a. In at least one embodiment, the high-frequency switched high-current signal is generated by a pulse width modulation (PWM) circuit included in a respective power circuit 202a-202d. The high-frequency switched high-current signal may have a frequency ranging from approximately 15 kilohertz to approximately 65 kilohertz, and may have a current value of approximately 0 amps to approximately 200 amps. In turn, the high-frequency switched high-current signal drives the actuator, e.g., a motor, which then adjusts the e-caliper so as to apply a braking force on a respective wheel 112, 114 necessary to slow down and/or stop the vehicle as determined by the first EBS controller 200a. Although only a section of the fault tolerant BBW system 102 controlled by the first EBS controller 200a has been described, it should be appreciated that the second section of the fault tolerant BBW system 102 controlled by the second EBS controller 200b may operate in a similar manner as discussed above.

In at least one embodiment, an isolator module 206 is connected between the first and second power sources 204a and 204b, and the remaining electrical system of the fault tolerant BBW system 102. The isolator module 206 is configured to receive constant high power signals generated by the first and second power sources 204a and 204b, and to generate a plurality of individual power input signals that are delivered to the EBS controllers 200a and 200b and the power circuits 202a-202d. For example, the isolator module 206 outputs first and second constant high voltage power signals to each power circuit 202a-202d as described in detail above. The isolator module 206 also outputs first and second low power signals that power the first and second EBS controllers 200a and 200b, respectively. In at least one embodiment, the first and second EBS controllers 200a and 200b are in electrical communication with the isolator module 206. In this manner, the first and second EBS controllers 200a and 200b may obtain various diagnostic information and circuit fault information including, but not limited to, short-circuit events, open circuit events, and over voltage events.

The isolator module 206 may also be configured to isolate circuit faults such as, for example, wire-to-wire short-circuits on a signaling line circuit (SLC) loop, and is capable of limiting the number of modules or detectors that may be rendered inoperative by a short-circuit fault on the SLC loop. According to a non-limiting embodiment, if a wire-to-wire short occurs, the isolator module 206 may automatically create and open-circuit (disconnect) in the SLC loop so as to isolate the brake assemblies 118a-118d from a short-circuit condition. In this manner, the fault tolerant BBW 102 according to a non-limiting embodiment provides at least one fault tolerant feature, which may allow one or more brake assemblies 118a-118d to avoid failure in the event a short-circuit condition occurs in the EBS 200. When the short-circuit condition is removed, the isolator module 206 may automatically reconnect the isolated section of the SLC loop, e.g., reconnect the brake assemblies 118a-118d.

Referring now to FIG. 2C, a fault tolerant BBW system 102 based on a full electronic brake system (EBS) controller topology is illustrated according to a non-limiting embodiment. The full EBS controller topology of FIG. 2C operates similar to the split EBS controller topology described above with reference to FIGS. 2A-2B. However, the full EBS system of FIG. 2C differs in that each EBS controller 200a and 200b electrically communicates with each power circuit 202a-202d. For example, both the first EBS controller 200a and the second EBS controller 200b may independently control the first power circuit 202a. In this manner, if the first EBS controller 200a is unable to properly control the first power circuit 202a, the second EBS controller 200b may provide the braking event data signal necessary to command the first power circuit 202a to output the high-frequency switched high-current signal for driving the first actuator 118a. Accordingly, the full controller BBW topology may provide additional fault tolerance functionality.

According to at least one embodiment, the full EBS controller topology includes a plurality of electronic brake system (EBS) controllers, where each EBS controller 200a and 200b among the plurality of EBS controllers is in electrical communication with each power circuit 202a-202d. In addition, the power circuits 202a-202d are located remotely from the brake assemblies 120a-120d, the first EBS controller 200a, and the second EBS controller 200b. Although the power circuits 202a-202d may operate independently with respect to one another, each EBS controller 200a and 200b is configured to output a data control signal to control any of the power circuits 202a-202d.

According to at least one embodiment, the EBS controllers 200a and 200b are configured to selectively operate in a split topology mode and a full topology mode based on monitored data. The monitored data includes, but is not limited, diagnostic results obtained in response to self-diagnostic operations executed by the first and/or second EBS controllers 200a and 200b. When operating in the split topology mode, for example, the first EBS controller 200a controls a first group of power circuits (e.g., 202a and 202d) while the second EBS controller 200b controls a second group of power circuits (202b and 202c). When operating in the full topology mode, however, either the first EBS controller 200a or the second EBS controller 200b controls both the first group of power circuits (e.g., 202a and 202d) and the second group of power circuits (e.g., 202b and 202c). That is, when operating in the full topology mode, either the first EBS controller 200a or the second EBS controller 200b controls all the power circuits 202a-202d.

As mentioned above, the EBS controllers 200a and 200b may transition into the full EBS topology mode based on diagnostic results obtained in response to performing self-diagnostic testing. For example, the first EBS controller 200a may perform a first self-diagnostic operation and communicates first diagnostic results to the second EBS controller 200b. Similarly, the second EBS controller 200b may perform its own second self-diagnostic operation and can communicate second diagnostic results to the first EBS controller 200a. A full EBS topology mode may then be initiated if the first diagnostic results and/or the second diagnostic results indicate an error. For example, if the second diagnostic results delivered by the second EBS controller 200b indicate an error, the first EBS can command the second EBS module 200b to enter into a stand-by mode or an off-line mode to invoke the full EBS topology mode, and in turn control all the power circuits 202a-202d included in the fault tolerant BBW system 102. In this manner, if the second EBS controller 200b contains a fault, the fault tolerant BBW system 102 may still be fully operated by the first EBS controller 200a thereby providing a fault tolerance feature.

Figure 4:
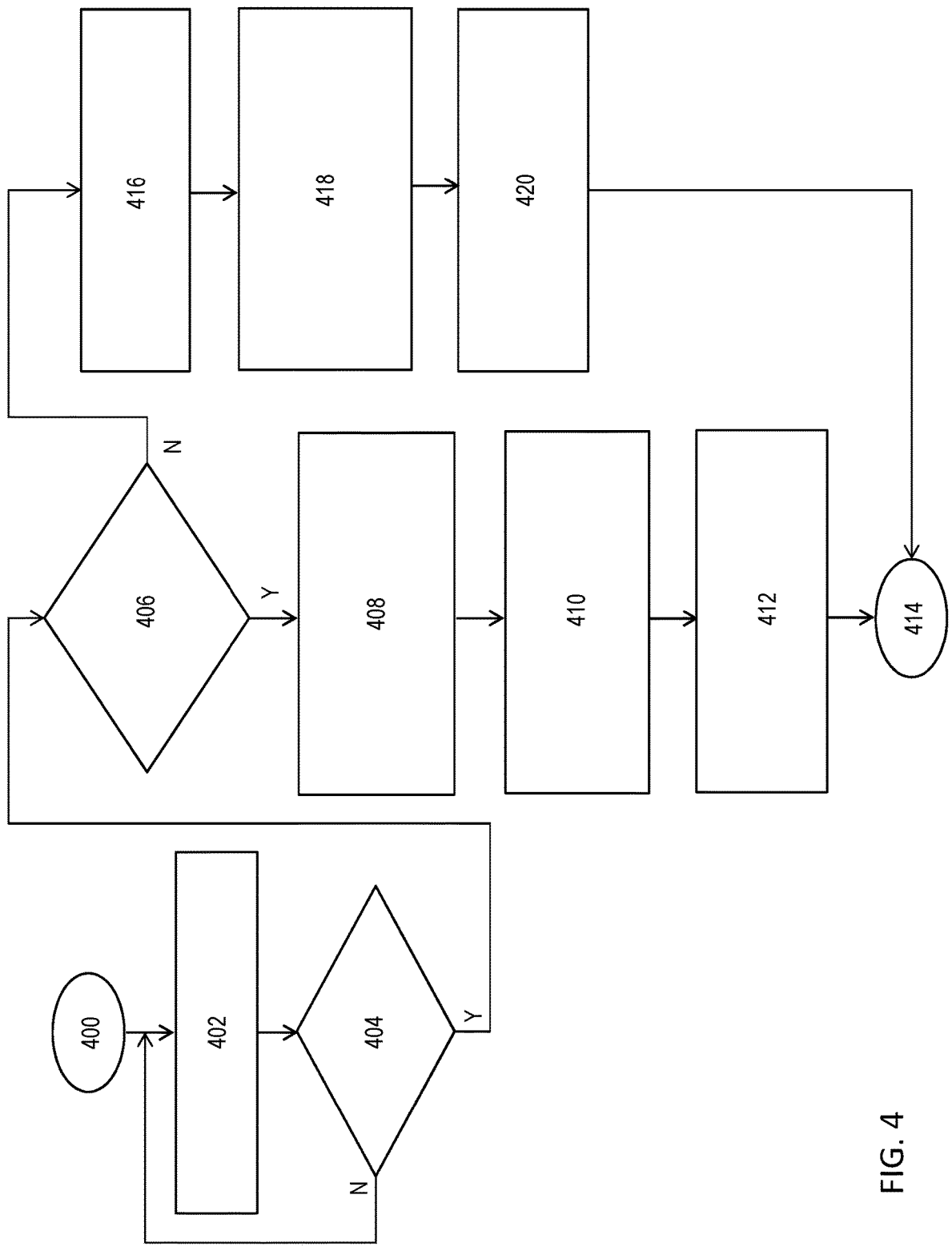
FIG. 4 is a flow diagram illustrating a method of controlling a fault tolerant BBW system according to a non-limiting embodiment.

Turning now FIG. 4, a flow diagram illustrates a method of controlling a fault tolerant electronic brake system according to a non-limiting embodiment. The method begins at operation 400 and at operation 402, sensor data is output to a first EBS controller and a second EBS controller. The sensor data may be output from various sensors installed on the vehicle including, but not limited to, wheel sensors, brake pedal sensors, and/or object detection sensors. At operation 404, a determination is made as to whether at least one EBS controller detects a braking event. The braking event is based on the sensor data described above. When no braking event is detected, the method returns to operation 402 and continues monitoring the sensor data.

When at least one of the EBS controllers detects a braking event, however, the first and second EBS controllers communicate with one another so as to compare their respective detected braking event data. For example, a first EBS controller may detect a first braking event and may request confirmation that the second EBS controller detected the same or a similar braking event. When the braking event data monitored and generated by the first EBS controller matches or substantially matches the braking event data monitored and generated by the second EBS controller, the method proceeds to operation 408 where the first EBS controller outputs a first data command signal to a first power circuit and the second EBS controller outputs a second data command signal to a second power circuit. In this manner, two separate and individual command signals are output by the first EBS controller and the second EBS controller, respectively. At operation 410, the first power circuit drives a first actuator in response to receiving the first data signal and the second power circuit drives a second actuator in response to receiving the second data signal. In at least one embodiment, the first actuator is installed in a first brake assembly and the second actuator is installed in a second brake assembly. The first brake assembly controls a first wheel and the second brake assembly is located remotely from the first brake assembly and controls a second wheel different from the first wheel. At operation 412, the first actuator varies a first braking torque applied to the first wheel and the second actuator varies a second braking torque applied to the second wheel. An amount of braking torque applied by the first and second actuators may be determined by the first and/or second EBS controllers. In this manner, the vehicle can be slowed or stopped according to the braking event detected by the first and second EBS controllers, and the method ends at 414.

Referring back to operation 406, a scenario may occur where the braking event data monitored and generated by the first EBS controller does not match or substantially match the braking event data monitored and generated by the second EBS controller. In this case, the method proceeds to operation 416 where one of the first EBS controller and the second EBS controller outputs a data command signal to both the first power circuit and the second power circuit. Accordingly, at operation 418, the first and second power circuits drive the first and second actuators based on the data signal output from a single EBS controller. This fault tolerant feature allows operation of the vehicle brake assemblies in the event an EBS controller and/or a section of the BBW (including the sensors communicating with a particular EBS controller) associated with a particular EBS controller experiences a fault. At operation 420, the first actuator adjusts a first braking torque applied to the first wheel and a second actuator adjusts a second braking torque applied to the second wheel, and the method ends at operation 414. In this manner, the vehicle may be slowed according to a detected braking event even if one or more of the EBS controllers do not operate according to expected conditions.

As described in detail above, various non-limiting embodiments provide a fault tolerant brake-by-wire (BBW) system which strategically separates one or more BBW components from one another to provide maximum flexibility in physical packaging. In at least one embodiment, for example, the BBW system includes a plurality of individual electronic brake system (EBS) controllers that control at least one respective brake assembly. A first EBS controller controls a first power circuit, while a second EBS controller, different from the first EBS controller, controls a second power circuit. In addition, the first and second power circuits are located remotely from the respective brake assembly of which they power. Accordingly, a flexible BBW system is provided that allows for flexible design choice, wire length reduction, and flexible braking algorithm implementation, while still employing fault tolerance into the system. In addition, separating the power circuits from the EBS controllers and/or the brake assemblies eliminates the need to implementing additional thermal mitigation measures.

As used herein, the term "module" or "unit" refers to an application specific integrated circuit (ASIC), field programmable gate array (FPGA), an electronic circuit, an electronic computer processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

While the embodiments have been described, it will be understood by those skilled in the art that various changes may be made and equivalents may be substituted for elements thereof without departing from the scope of the embodiments. In addition, many modifications may be made to adapt a particular situation or material to the teachings of the embodiments without departing from the essential scope thereof. Therefore, it is intended that the disclosure not be limited to the particular embodiments disclosed, but that the disclosure will include all embodiments falling within the scope of the application.

What is claimed is:

1. A vehicle including a fault tolerant electronic brake-by-wire (BBW) system, the vehicle comprising:
   a plurality brake assemblies, each brake assembly including an electro-mechanical actuator configured to decelerate a respective wheel of the vehicle;
   a plurality of electrical power circuits located remotely from one another, each power circuit being configured to drive a respective actuator; and
   a plurality of electronic brake system (EBS) controllers, each EBS controller among the plurality of EBS controller being in electrical communication with each power circuit among the plurality of power circuits,
   wherein each electrical power circuit is in electrical communication with a respective actuator, and is configured to output a high-frequency switched high-power signal that drives the respective actuator, the high-frequency switched high-power signal having an upper frequency value that reaches 65 kilohertz and an upper current value that reaches 200 amps.

2. The vehicle of claim 1, wherein the power circuits are located remotely from the brake assemblies, the first EBS controller, and the second EBS controller.

3. The vehicle of claim 2, wherein any EBS controller among the plurality of EBS controller is configured to output a data control signal to control any power circuit among the plurality of electrical power circuits.

4. The vehicle of claim 1, wherein the plurality of EBS controllers includes a first EBS controller and a second EBS controller remotely located from the first EBS controller, the first and second EBS controllers configured to selectively operate in a split topology mode and a full topology mode based on diagnostic results generated by at least one of the first and second EBS controllers.

5. The vehicle of claim 4, wherein:
   when operating in the split topology mode, the first EBS controller controls a first group of power circuits among the plurality of power circuits and the second EBS controller controls a second group of power circuits among the plurality of power circuits, the second group excluding power circuits from the first group, and
   when operating in the full topology mode, one of the first EBS controller and the second EBS controller controls both the first group of power circuits and the second group of power circuits.

6. The vehicle of claim 5, wherein:
   the first EBS controller performs a first self-diagnostic operation and communicates first diagnostic results to the second EBS controller, the second EBS controller performs a second self-diagnostic operation and communicates second diagnostic results to the first EBS controller; and
   at least one of the first and second EBS controllers initiate the full topology mode when at least one of the first and second diagnostic results indicate an error.

7. A method of controlling a fault tolerant electronic brake-by-wire (BBW) system, the method comprising:
   detecting a brake request to brake at least one wheel of a vehicle;
   outputting, via a first electronic brake system (EBS) controller, a first data command signal to control a first group of power circuits among a plurality of power circuits;
   outputting, via a second EBS controller, a second data command signal to control a second group of power circuits among the plurality of power circuits, the second group excluding the power circuits from the first group;
   outputting a first high-power drive signal from at least one power circuit included in the first group, and outputting a second high-power drive signal from at least one power circuit included in the second group, the first and second high-power drive signal each having an upper current value that reaches 200 amps;
   controlling at least one actuator based on at least one of the first and second high-power drive signals so as to brake the at least one wheel according to the brake request; and
   selectively operating the first and second EBS controllers in a split topology mode and a full topology mode based on diagnostic results generated by at least one of the first and second EBS controllers, wherein in the split topology mode the first EBS controller controls only the first group of power circuits and the second EBS controller controls only the second group of power circuits, and in the full topology mode each of the first and second EBS controllers are configured to independently control both the first group of power circuits and the second group of power circuits.

8. The method of claim 7, further comprising controlling a first actuator based on the first high-power drive signal and controlling a second actuator independently from the first actuator based on the second high-power drive signal.

9. The method of claim 8, further comprising controlling the first group of power circuits independently from the second group of power circuits.

10. The method of claim 9, further comprising controlling a first power circuit included in the first group independently from a second power circuit included in the first group, and controlling a third power circuit included in the second group independently from a fourth power circuit included in the second group.

* * * * *